Dec. 15, 1942. W. B. SCHUEREN ET AL 2,305,111
AUTOMOBILE WHEEL LOCKING ASSEMBLY
Filed March 4, 1942 2 Sheets-Sheet 1
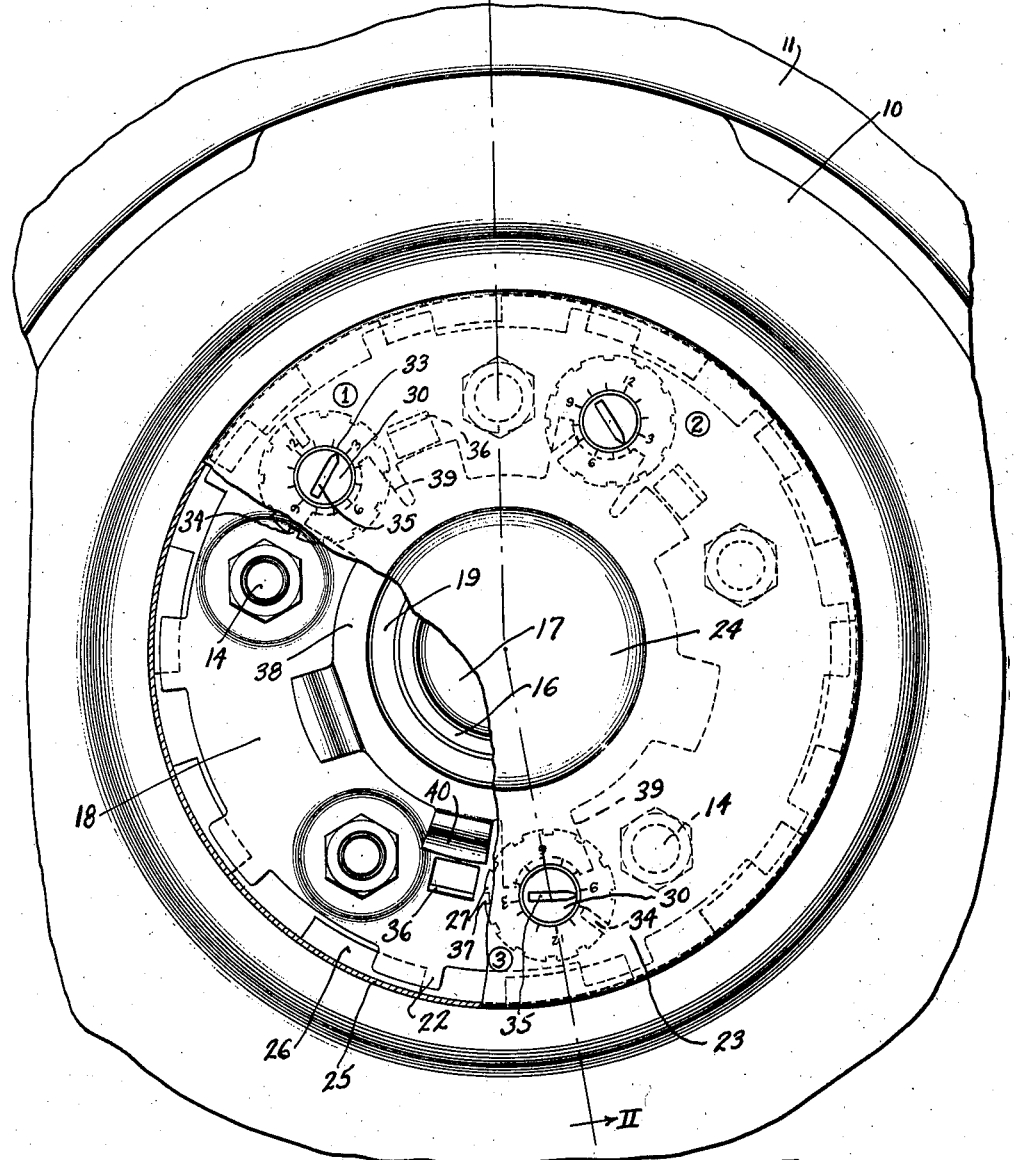
Inventors
WILLIAM B. SCHUEREN.
GEORGE W. SCHATZMAN.

Dec. 15, 1942.　　W. B. SCHUEREN ET AL.　　2,305,111
AUTOMOBILE WHEEL LOCKING ASSEMBLY
Filed March 4, 1942　　2 Sheets-Sheet 2
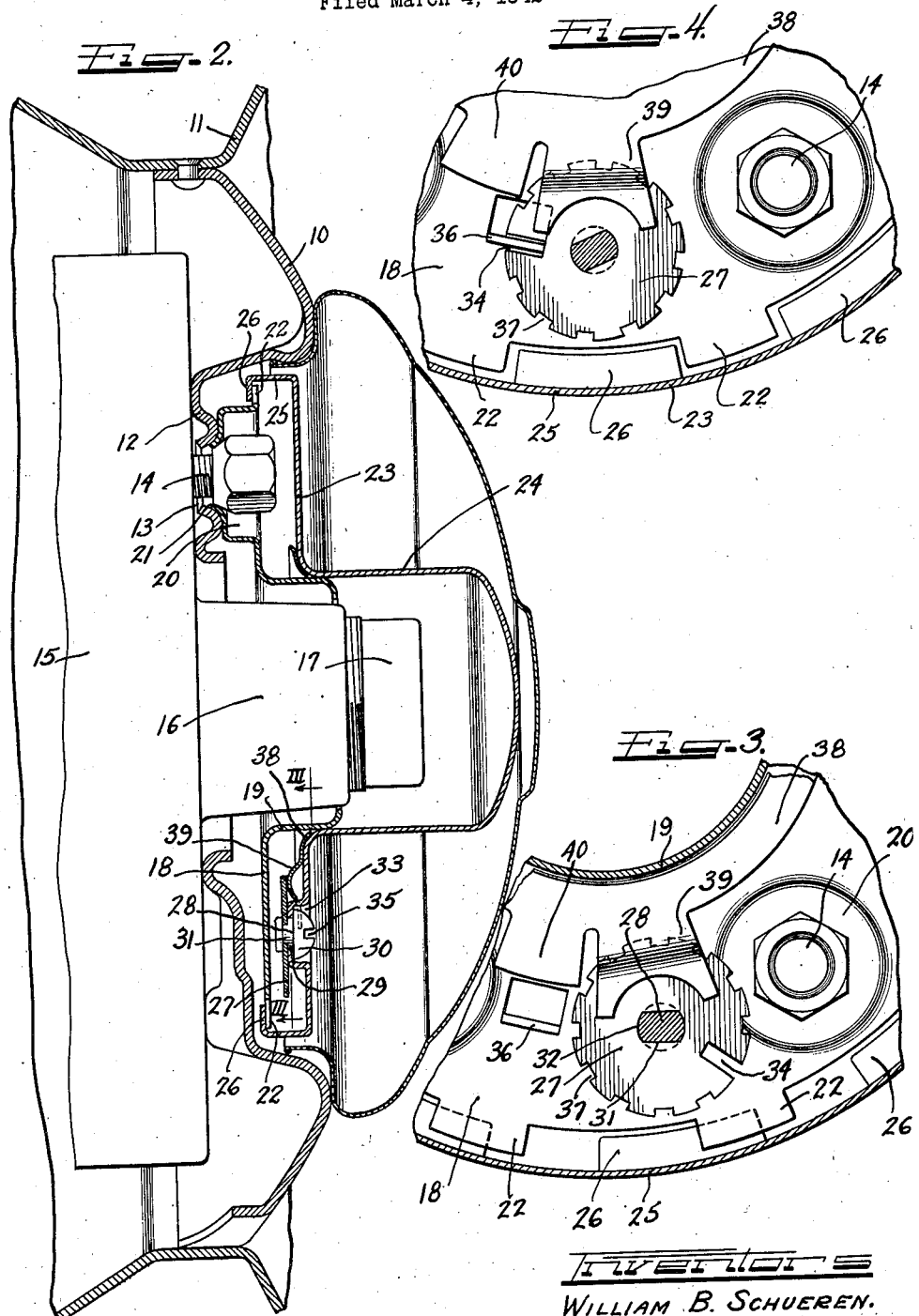
Inventors
WILLIAM B. SCHUEREN.
GEORGE W. SCHATZMAN.

Patented Dec. 15, 1942

2,305,111

UNITED STATES PATENT OFFICE 2,305,111

AUTOMOBILE WHEEL LOCKING ASSEMBLY

William B. Schueren and George W. Schatzman, Detroit, Mich., assignors to Houdaille-Hershey Corporation, Detroit, Mich., a corporation of Michigan Application March 4, 1942, Serial No. 433,276

5 Claims. (Cl. 70—171)

This invention relates to locking assembly for automobile wheels for frustrating removal of a wheel from its supporting hub structure or removal of the entire hub structure and wheel from the wheel supporting bearing spindle.

An important object of the invention is to provide a locking assembly comprising a keeper member which may be secured to the wheel by the same bolts which secure the wheel to its supporting hub, and a locking cover having interlocking connection with the keeper member to form therewith an enclosure for the wheel securing bolts and the end of the wheel hub so as to prevent access to the bolts for removal of the wheel from its hub structure or access to the spindle bolt for removal of the hub structure and wheel from the spindle, together with improved lock means, preferably of the commutation or combination type, for holding the locking cover in interlocking engagement with the keeper member.

The invention also involves other features of construction and arrangement, all of the various features being embodied in the structure shown on the drawings, in which:

Figure 1 is a front elevation of the central portion of a wheel structure showing the lock assembly applied thereto and with the locking cover partly broken away;

Figure 2 is a section on plane II—II of Figure 1;

Figure 3 is an enlarged section on plane III—III of Figure 2 showing one of the lock members in locking condition; and Figure 4 is a view similar to Figure 3 showing the locking member in unlocked condition.

The wheel structure shown comprises the wheel disk 10 which supports the rim 11 for mounting of a tire (not shown). The inner portion of the disk 10 is deflected inwardly to provide an annular flange 12 having the holes 13 therethrough for receiving the bolt structures 14 for securing the wheel to the brake drum 15 forming part of the hub 16 for which a cap or closure plug 17 may be provided.

The locking assembly shown comprises the keeper member 18 which may be formed integral of sheet metal whose central portion is deflected outwardly to form the annular flange 19 for surrounding the hub 16. At its outer portion the keeper member is deflected inwardly to form recesses 20 where holes 21 are provided for receiving the bolt structures 14, so that these bolt structures will secure the keeper member together with the wheel disk to the brake drum. Around its peripheral portion, the keeper is cut away to leave radially extending keeper tongues 22.

A locking cover 23 of sheet metal has the central cup portion 24 for receiving the outer end of the wheel hub 16 and the outer end of the flange 19 on the keeper member 18. The cover has the inwardly extending peripheral flange 25 from whose end locking tongues 26 extend radially inwardly for cooperation with the keeper tongues to lock the cover to the keeper structure against axial removal therefrom, the cover and the keeper then forming an enclosure for the wheel and keeper supporting bolt structure to prevent access thereto.

For locking the locking cover against reverse rotational movement after axial and rotational movement thereof to bring the locking tongues 26 behind the keeper tongue 22, I provide a number of lock members on the locking cover for locking association with lock members on the keeper structure, the lock members on the cover requiring predetermined settings before release thereof from the lock members on the keeper structure.

Any number of such lock member assemblies can be provided, the drawings showing three. Each of the lock member assemblies comprises a lock disk or wheel 27 secured to the inner end of a pin 28 which extends forwardly through an opening 29 in the locking cover and terminates in a head 30 engaging against the front of the cover. As shown on Figure 3, the pin may have an oblong or neck section 31 for extending through the correspondingly shaped opening 32 in the lock disk, the inner end of the pin being then riveted over against the disk to thus securely hold it to the inner end of the pin. Preferably also, the portions of the cover through which the openings 29 extend are deflected inwardly to provide the recesses 33 for the pin heads 30.

Each lock disk 27 has a slot 34 extending a distance radially inwardly from the outer edge thereof, and in the end of the head 30 on the supporting pin for each disk is a formation, such as a transversely extending slot 35, for receiving a screwdriver or other suitable tool by means of which the lock disk may be readily rotationally set. The direction of extent of these turning slots relative to the disk slots 34 is different for the three disks shown, and on the cover 23 indicating lines extend radially and around the depressions 33 in which the pin heads are located, and one end of the turning slot 35 may be pointed to cooperate with the radial indicating lines for proper setting of the lock disks, all as shown on Figure 1, the radial lines having indicating numerals applied thereto to facilitate setting of the disks, there being, as shown, twelve indicating lines equally spaced apart around each pin head. Numerals 1, 2, and 3 may also be applied on the cover adjacent to the disks so as to identify them as Nos. 1, 2, and 3.

For cooperation with each lock disk 27 is a lock plate 36, and these plates may be portions of the keeper member 18 deflected forwardly therefrom. The lock disks and their associated locking plates are located substantially in the circle of the wheel securing bolts 14, each disk, upon application of the locking cover, being between its locking plate and one of the bolts. Referring to Figure 4, when the locking cover is to be applied, the locking disks 27 are first each turned, in accordance with the proper combination, to bring the disk slots into position to receive their respective lock plates 36. The cover is then slipped over the end of the keeper flange 19 and turned for reception of the lock plates 30 in the slots, the lock tongues 26 on the cover being then in registration with the spaces between the keeper tongues 22, so that the cover structure may be shifted fully inwardly and then turned to bring the lock tongues behind the keeper tongues and to withdraw the disks from the lock plates 36. The disks 27 are then turned to bring their respective slots 34 out of alignment with the lock plates, as shown on Figure 3. Now, when an attempt is made to turn the cover in reverse direction for displacement of the locking tongues from the keeper tongues, this will be prevented as the solid portions of the disk peripheries will abut the respective locking plates 36 to prevent such reverse turning, the cover being thus securely locked against removal from the keeper structure. Figure 1 shows the locking disks all in locking position. To unlock the cover, the lock disks must be turned to unlocking position, the turning of the disks to their unlocking positions being determined by the setting of the slots 35 with the pointer ends at the indicating numbers which the unlocking combination calls for. The lock disks 27 may have shallow notches 37 in their edges, so that the lock structure cannot be picked by forcing the edges of the disks against their respective lock plates 36 and the disks turned until the locking slots 34 come into registration with the lock plates. Such picking will thus be prevented, as turning of the disks under such pressure will result only in bringing some of the shallow notches into registration with the locking plates.

In order to frictionally lock the lock disks in set positions, an annular spring plate 38 is secured, as by welding, to the inner side of the cover 23 at the base of the cup part 24, this spring plate having arms 39 extending therefrom for engaging against the front sides of the lock disks to exert sufficient pressure to hold the disks in their set position. The spring plate may also have arms 40 extending therefrom for pressure engagement with the keeper 18 when the cover is applied, so that the spring pressure will tend to urge the cover outwardly for holding the locking tongues on the cover in abutting engagement with the keeper tongues and to prevent lost motion or rattling of the locking cover.

The locking tongues 26 are preferably of a longitudinal length to substantially fill the spaces between the keeper tongues 22, so that the locking tongues cannot be moved axially past the keeper tongues until the lock disk slots 34 have received their respective lock plates 36, as shown on Figure 4. The rotation of the locking cover to the locking position shown in Figure 3 will be limited by the engagement of the lock disks or their supporting pins with the heads of the adjacent supporting bolts.

We have shown a practical and efficient embodiment of the features of our invention, but we do not desire to be limited to the exact construction, arrangement, and operation shown and described, as changes and modifications may be made without departing from the scope of the invention.

We claim as follows:

1. A locking assembly for an automobile wheel of the type disclosed, comprising a keeper member having bolt holes for receiving the bolts which secure the wheel to its hub structure, a locking cover for engaging in front of the wheel bolts to prevent access thereto and having a cup-shaped portion for receiving the outer end of the wheel hub, a number of lock disks on said cover structure rotatable from the outside thereof and each having a notch extending radially inwardly on its peripheral edge, keeper plates on said keeper member for said lock disks, means adapted upon a partial rotary movement of said locking cover for locking it to said keeper member against axial removal therefrom, indicating means on said cover for determining the individual rotation of said lock discs to oppose their peripheral edges to the respective locking plates whereby said plates will prevent unlocking rotational movement of said cover, or to set said lock discs with their slots in registration with the respective lock plates whereby to permit unlocking rotation of said cover for axial removal thereof from the keeper member.

2. A locking assembly for an automobile wheel of the type disclosed, comprising a keeper member having bolt holes for receiving the bolts which secure the wheel to its hub structure and having an outwardly extending flange for surrounding the outer end of the wheel hub, a locking cover having a central cup-shaped portion for receiving the outer end of the keeper member flange and for enclosing the outer end of the hub and having an outer portion in front of the wheel securing bolt to prevent access thereto, means effective upon partial rotation of said cover for locking said cover to the keeper structure against outward axial movement, a number of lock discs on the inner side of said cover, means for each lock disk accessible from the outside of the cover for turning the disk, each disk having a slot extending inwardly from the peripheral edge thereof, locking plates on said keeper member for cooperation with said disks, indicating means on said cover associated with the respective disk turning means whereby said disks may be turned to bring their slots out of registration with their respective lock plates whereby said plates will then be abutted by the peripheral edges of said disks to prevent unlocking rotation of said cover, or whereby said disks may be set to bring their slots into registration with the respective lock plates to permit unlocking rotation of the cover for axial removal thereof from the keeper member.

3. Locking assembly for an automobile wheel of the type described, comprising an annular keeper member for surrounding the outer end of the wheel hub and having bolt holes for receiving bolts which secure the wheel to the hub structure, a locking cover adapted at its outer portion to be disposed in front of the wheel supporting bolts to prevent access thereto and having a central deflected portion for receiving and enclosing the outer end of the wheel hub, tongues on said keeper member and said cover adapted upon a partial rotation of said cover to interlock and to hold said cover against axial outward movement away from the keeper member, a number of lock disks on the rear side of said cover each having a supporting pin extending through the cover and terminating at the front thereof in a head whereby said disks may be individually rotationally set, each disk having a slot extending radially inwardly from the peripheral edge thereof, lock plates on said keeper member for cooperation with said lock disks, indicating means on said cover associated with said disk turning heads for determining the degree of rotation of said heads to bring the slots in said disks into registration with their respective locking plates whereby to premit unlocking rotation of said cover for axial removal thereof from said keeper member, said lock plates before such unlocking setting of the disks being opposed to the peripheral edges of the disks to prevent unlocking rotation of the cover.

4. Locking assembly on an automobile wheel of the type described comprising an annular keeper member having bolt holes receiving the bolts which secure the wheel to its hub structure, a locking cover extending in front of the locking bolts to prevent access thereto and having a central deflected portion receiving and enclosing the outer end of the wheel hub, means adapted upon a partial rotation of said cover to lock said cover to the keeper member against outward axial displacement therefrom, a number of lock disks on the inner side of said cover, and means on the outside of the cover for said disks for individual rotational setting thereof, each disk having a radially extending slot terminating at the disk periphery, locking plates on said keeper member for cooperation with said disks, said disks after application of said cover to the keeper member being set with their peripheral edges opposed to said locking plates whereby unlocking rotation of the cover will be prevented, indicating means on said cover for determining the degree of rotation of said disks to bring their slots into registration with their locking plates whereby said cover may then be rotated in unlocking direction for axial removal from said keeper member, and a spring plate on said locking cover having arms engageable with the respective lock disks to yieldably lock them in set position.

5. Locking assembly on an automobile wheel of the type described, comprising an annular keeper member having bolt holes receiving the bolts which secure the wheel to its hub structure, a locking cover extending in front of the locking bolts to prevent access thereto and having a central deflected portion receiving and enclosing the outer end of the wheel hub, means adapted upon a partial rotation of said cover to lock said cover to the keeper member against outward axial displacement therefrom, a number of lock disks on the inner side of said cover, and means on the outside of the cover for said disks for individual rotational setting thereof, each disk having a radially extending slot terminating at the disk periphery, locking plates on said keeper member for cooperation with said disks, said disks after application of said cover to the keeper member being set with their peripheral edges opposed to said locking plates whereby unlocking rotation of the cover will be prevented, indicating means on said cover for determining the degree of rotation of said disks to bring their slots into registration with their locking plates whereby said cover may then be rotated in unlocking direction for axial removal from said keeper member, and a spring plate on said locking cover having arms engageable with the respective lock disks to yieldably lock them in set position and having other arms engageable with said keeper member whereby to hold said locking cover against loose motion when it is interlocked with the keeper member.

WILLIAM B. SCHUEREN.
GEORGE W. SCHATZMAN